United States Patent
Diaz

(10) Patent No.: US 6,213,566 B1
(45) Date of Patent: Apr. 10, 2001

(54) BRAKE PROPORTIONING IN-LINE BALL VALVE

(75) Inventor: Juan Diaz, Plano, TX (US)

(73) Assignee: Hilite Industries Automotive, LLP, Carrollton, TX (US)

( * ) Notice: Subject to any disclaimer, the term of this patent is extended or adjusted under 35 U.S.C. 154(b) by 0 days.

(21) Appl. No.: 09/300,572

(22) Filed: Apr. 27, 1999

(51) Int. Cl.[7] .................................................. B60T 13/00
(52) U.S. Cl. ........................ 303/9.75; 303/9.62; 188/349
(58) Field of Search .............................. 303/9.75, 9.71, 303/9.62, 9.64, 9.65, 9.73, DIG. 1, DIG. 2, 113.5, 113.2, 119.1; 188/344, 349

(56) References Cited

U.S. PATENT DOCUMENTS

| | | | |
|---|---|---|---|
| 3,245,221 | * | 4/1966 | James et al. ........................ 188/349 |
| 3,377,108 | * | 4/1968 | Eddy .................................... 188/349 |
| 3,781,063 | * | 12/1973 | Valpreda ............................. 303/9.71 |
| 4,335,922 | * | 6/1982 | Berisch et al. ..................... 303/9.75 |
| 4,606,583 | * | 8/1986 | Gaiser ................................ 303/9.75 |
| 4,637,664 | * | 1/1987 | Arikawa ............................. 303/9.71 |
| 4,850,651 | | 7/1989 | Latvala . |
| 4,861,114 | * | 8/1989 | Takata ................................ 303/9.72 |
| 4,893,878 | | 1/1990 | Cole et al. . |
| 5,066,072 | | 11/1991 | Yanagi et al. . |
| 5,322,354 | | 6/1994 | Yamakoshi . |
| 5,362,136 | | 11/1994 | Wallestad . |
| 5,462,341 | | 10/1995 | Koyano et al. . |
| 5,472,266 | * | 12/1995 | Volz et al. ..................... 303/DIG. 2 |
| 5,522,651 | | 6/1996 | Sorensen . |
| 5,544,946 | * | 8/1996 | Toyoda et al. ..................... 303/9.64 |
| 5,741,049 | | 4/1998 | Sorensen . |

FOREIGN PATENT DOCUMENTS

| | | | |
|---|---|---|---|
| 684722 | * | 3/1965 | (IT) ..................................... 188/349 |

\* cited by examiner

*Primary Examiner*—Christopher P. Schwartz
*Assistant Examiner*—Thomas J. Williams
(74) *Attorney, Agent, or Firm*—Haynes and Boone LLP

(57) ABSTRACT

An apparatus is described wherein for a device for controlling the flow of fluid. A housing having an inlet for receiving the fluid, an outlet for discharging the fluid, and a bore connecting the inlet to the outlet is provided. A piston is disposed in the bore and has a through bore for permitting the flow of the fluid through the piston. A valve member is disposed in the bore of the piston and adapted to engage an internal surface of the piston to block fluid flow through the piston and therefore through the housing, the piston responding to an increase in pressure at the outlet as a result of the fluid flow for moving in a direction toward the valve member until the valve member engages the piston surface to restrict fluid flow. A stop member is disposed in the housing and extends into the bore of the piston for stopping movement of the piston after it engages the valve member. Further, the embodiment includes means for normally positioning the valve member away from the surface so that fluid flows through the piston.

31 Claims, 6 Drawing Sheets

BRAKE PROPORTIONING IN-LINE BALL VALVE

BACKGROUND

This disclosure relates generally to brake pressure proportioning in-line ball valves, and more particularly to an improved valve having relatively few components and a relatively short length.

Brake proportioning valves are used in automobiles and other vehicles. In these applications, it is often necessary to proportion brake fluid pressure between front and rear wheel brakes, or cylinders, as less braking power is needed in the rear wheel brakes. A brake pedal is operably attached to a master cylinder, which is connected to the wheel brakes via hydraulic lines. Depressing the brake pedal causes the master cylinder to increase hydraulic pressure at its outlet. The master cylinder outlet is connected to separate hydraulic lines for the front and rear wheel brakes, or for the right and left wheel brakes, to carry the increased hydraulic pressure through the lines to the respective wheel brakes. In either case, a brake proportioning valve, or a plurality of brake proportioning valves, is disposed between the master cylinder outlet and the rear wheel brakes to allow proportionately less hydraulic pressure from the master cylinder to reach the rear wheel brakes, thereby achieving the proper braking proportion.

The brake proportioning valve has an inlet connected to the master cylinder, and an outlet operably connected to the rear wheel brakes. At low inlet pressures, where the brake is not applied, brake fluid flows freely in both directions through the brake proportioning valve. However, as brake fluid pressure increases at the valve's inlet in response to application of the brake pedal, a predetermined level is reached where pressure at the valve's outlet forces a piston to engage a ball to restrict the flow of brake fluid to the rear wheel brakes.

This predetermined level is known as the knee point pressure, and is equivalent to the force holding the valve open divided by a differential relating to the area of the inlet pressure seal and the area of the outlet pressure seal. For the valve to perform, the outlet seal diameter must be greater than the inlet seal diameter. Thus, there is a benefit in making the inlet seal diameter as small as possible so that the outlet seal, and therefore the entire valve, does not take up a great deal of space.

A brake proportioning valve of the prior art is disclosed in U.S. Pat. No. 5,522,651, and provides proportioning of brake fluid pressure using a plunger of two diameters against which hydraulic pressure operates, and a check ball located in the plunger and held off its seat under low outlet pressure conditions by a rod and valve lifter. The ball is biased in place by a ball spring. At high outlet pressure, i.e., above the knee point pressure, the plunger contacts the ball and restricts fluid flow. A continuation-in-part of the above-referenced patent, U.S. Pat. No. 5,741,049, operates similarly.

However, several disadvantages are associated with this prior art. First, the rods do not directly engage their respective housings. Instead, each rod requires extra elements, such as a valve lifter assembly, to support the rod, thereby complicating manufacture. Second, the ball springs could become completely compressed by the balls, undesirably restricting fluid flow. Third, the outlet seal diameters are larger than their respective plunger springs' diameter, thus limiting the variety of plunger spring strengths that can be used, and hence lowering the possible range of knee points.

Therefore, what is needed is an apparatus having less components and steps in assembly, as well as a shorter length when compared to the above system, without having the disadvantages associated with the systems.

SUMMARY

Accordingly, one embodiment disclosed herein is a device for controlling the flow of fluid, and therefore fluid pressure. A housing having an inlet for receiving the fluid, an outlet for discharging the fluid, and a bore connecting the inlet to the outlet is provided. A piston is disposed in the bore and has a through bore for permitting the flow of the fluid through the piston. A valve member is disposed in the bore of the piston and adapted to engage an internal surface of the piston to block fluid flow through the piston and therefore through the housing, the piston responding to an increase in pressure at the outlet as a result of the fluid flow for moving in a direction toward the valve member until the valve member engages the piston surface to restrict fluid flow. A stop member is disposed in the housing and extends into the bore of the piston for stopping movement of the piston after it engages the valve member. Further, the embodiment includes means for normally positioning the valve member away from the surface so that fluid flows through the piston.

One advantage of the embodiment described herein is that a piston spring surrounds the valve member and the greater part of the piston, resulting in a relatively shorter valve length.

Another advantage of the embodiment described herein is that the stop member has an extension which protrudes through a valve member spring, thus preventing complete compression of the spring and consequent restriction of flow. Also, the stop member's extension has a cross slot to prevent the valve member from blocking the extension bore and restricting flow during inlet pressure release.

Yet another advantage of the embodiment described herein is that the positioning means directly engages the housing instead of being supported by additional components, thus simplifying manufacture. Furthermore, the housing edge is staked over the stop member, which is more reliable than a pressed-in retainer.

Another advantage of the embodiment described herein is that an inlet pressure seal is disposed inside the piston, which results in a more favorable variation between the inlet seal area and the outlet seal area. Also, no bored venting passage is required, thus facilitating manufacture.

DESCRIPTION OF THE PREFERRED EMBODIMENTS

Figure 1:
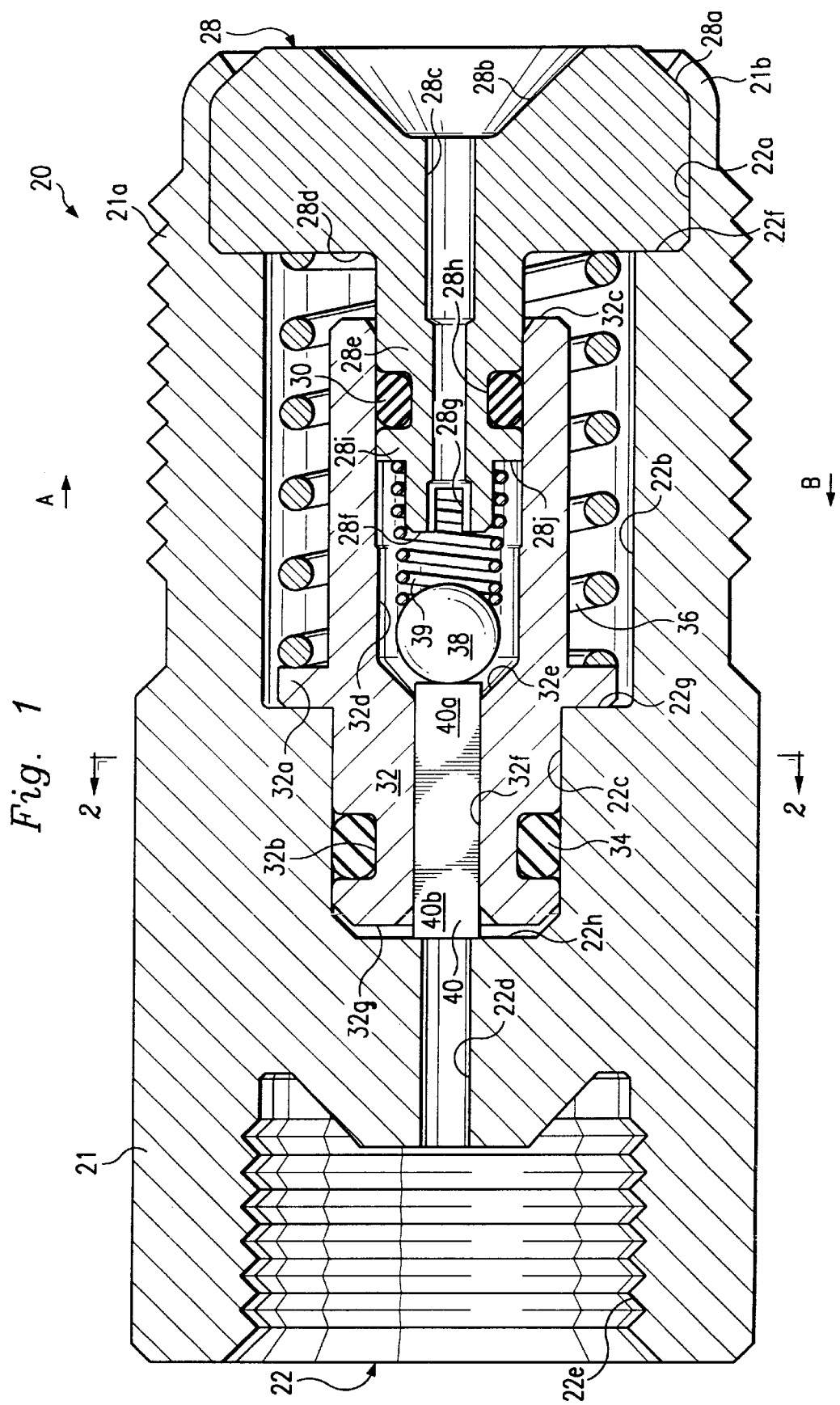
FIG. 1 is a longitudinal sectional view of an embodiment of the present invention in a first orientation.
Figure 2:
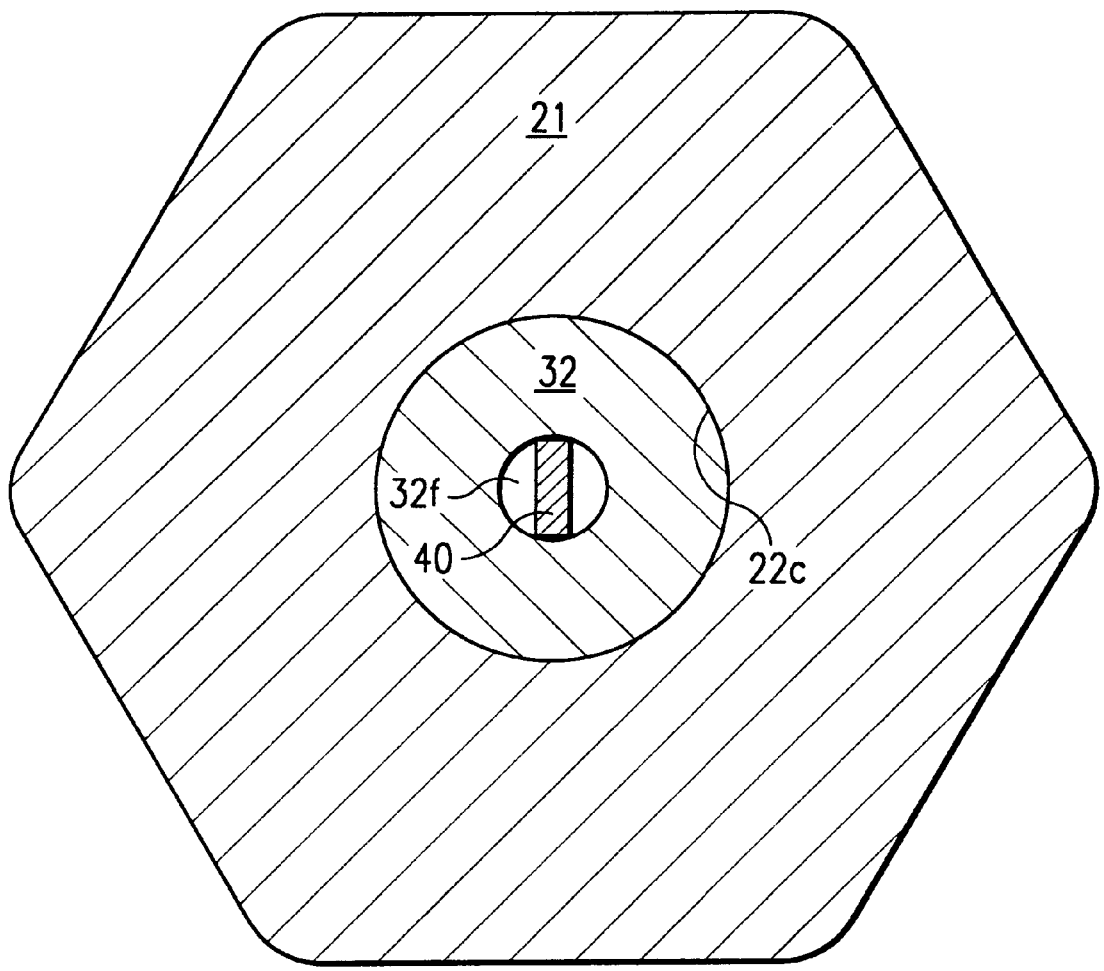
FIG. 2 is a transverse sectional view of the embodiment of FIG. 1, taken along a line 2—2 of FIG. 1

Referring to FIGS. 1 and 2 of the drawings, the reference numeral 20 refers to a brake proportioning in-line valve of one embodiment of the present invention. The valve 20 has a generally hexagonal housing 21 which may be made of metal or other durable material. The housing 21 has an inlet end portion, depicted on the right as viewed in FIG. 1, and an outlet end portion, depicted on the left as viewed in FIG. 1. It is understood that the valve 20 is connected in a vehicle fluid braking system, with the inlet end portion connected to the outlet of a master cylinder, and the outlet end portion connected to at least one rear wheel brake cylinder, or caliper, as will be explained. As these features are all conventional, they will not be described further. An external threaded portion 21a of the housing 21, and a staked edge 21b of the housing 21, are located at the inlet end portion.

The housing 21 has an axial through bore 22 which is stepped along its length to form a series of sections 22a–22e extending from the inlet end portion to the outlet end portion. The corresponding diameters of the sections 22a–22d range from the largest to the smallest, respectively. The bore sections 22a–22e may be produced by any conventional means, and define a series of shoulders or steps, 22f, 22g, and 22h, at the junction of the sections 22a and 22b, sections 22b and 22c, and sections 22c and 22d, respectively. The section 22e is internally threaded and adapted to mate with a hydraulic line (not shown), which operably connects to the rear wheel brakes.

A cap, generally referred to by reference numeral 28, is disposed in the housing 21. The cap 28 is substantially T-shaped in cross section, and is held in a relatively tight fit between the housing step 22f and the staked edge 21b. The cap 28 includes a rounded edge 28a adjacent to the staked edge 21b to facilitate attachment. It is understood that any other conventional means may be used for retaining the cap 28, such as a pressed in retainer. For reasons to be described, it is desirable that the attaching means allow air to pass between the cap 28 and the housing 21.

An inlet seat 28b is formed in the cap 28, and is inwardly tapered to register with an axial through bore 28c. The exterior of the cap 28 further includes a flat surface 28d oriented opposite the inlet seat 28b for reasons to be described. A portion of the flat surface 28d engages the step 22f of the housing 21, and the flat surface 28d is located at an end of the area defined by the section 22b of the housing 21.

The cap 28 includes an extension 28e that extends into the bore section 22b for reasons to be described. The extension 28e is cylindrical in shape, with the cap bore 28c extending axially throughout its length. An end 28f of the extension includes a transverse slot 28g. A radial stepped down portion 28h of the extension is disposed approximately midway down the extension 28e. An annular flange 28i is formed on extension 28e, and a seal 30 is disposed between the flange 28i and the stepped down portion 28h, for reasons to be described.

A piston 32 is slidably mounted within the areas defined by the sections 22b and 22c of the housing 21, and slidably extends over the cap extension 28e. The piston 32 is cylindrical, and substantially Y-shaped in cross section, as will be explained.

An annular flange 32a is formed on the outer surface of the piston 32. The outer surface of the piston 32 also has a radial groove 32b which receives an outlet pressure elastomeric seal 34, forming a seal between the piston 32 and the wall of the housing 21 defining the section 22c. The seal 34 isolates the outlet brake fluid pressure in section 22c to the left of the seal 34, as viewed in FIG. 1, and therefore in sections 22d and 22e. The pressure outside the piston 32 to the right of the seal 34, as viewed in FIG. 1, is kept at atmospheric pressure because venting occurs at the joint between the cap 28 and the housing 21.

A relatively large bore 32d is formed in the piston 32 and is connected, through a tapered bore, or seat, 32e to a relatively small bore 32f. The large bore 32d extends over a portion of the cap extension 28e. The inlet seal 30 engages the surface of the piston 32 defining the bore 32d to isolate the brake fluid inlet pressure in the cap bore 28c and the piston bore 32d. The bore 32f is subjected to the above described outlet pressure.

A spring 36 extends between the flat surface 28d of the cap 28 and the annular flange 32a to bias the flange against the housing step 22g. The diameter of the piston spring 36 is greater than the diameter of the bore section 22c, for reasons to be described.

Figure 3:
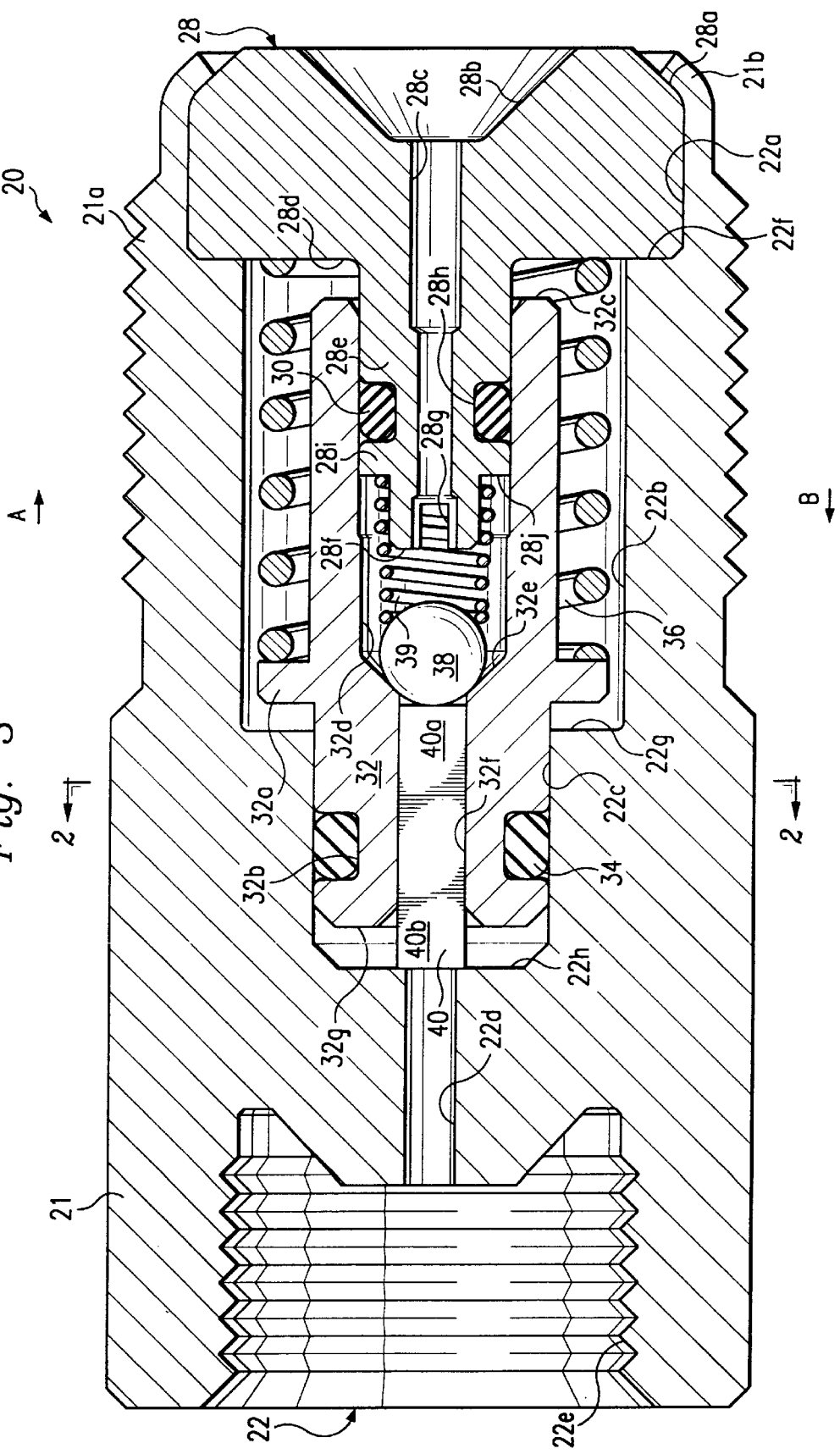
FIG. 3 is a longitudinal sectional view of an embodiment of the present invention in a second orientation.

The piston 32 moves between the position shown in FIG. 1 to an intermediate position between the position of FIG. 1 and a position in which an end 32c of the piston 32 engages the flat surface 28d of the cap 28. An example of this intermediate position is shown in FIG. 3, it being understood that the term intermediate position defined herein means any position between the position of FIG. 1 and the position in which the end 32c of the piston 32 engages the flat surface 28d. The piston also has another end 32g, disposed in bore section 22c, as will be explained.

A ball 38 is disposed in the large bore 32d of the piston 32. When the piston 32 is in the intermediate position of FIG. 3, the ball 38 engages the seat 32e, forming a seal. A spring 39 extends between the ball 38 and the annular flange 28i of the cap 28 and over a portion of the cap extension 28e. The spring 39 thus urges the ball 38 in a direction indicated by arrow B.

Referring to FIGS. 1–3, a rod 40 in the form of a flat, rectangular piece of metal is disposed inside the small bore 32f of the piston 32. A first end 40a of the rod 40 engages the ball 38, and a second end 40b of the rod 40 engages the housing step 22h.

It is understood that the valve 20 is connected in a hydraulic braking system for a vehicle that includes a brake pedal operably attached to a master cylinder, which is connected to rear wheel brakes via hydraulic lines. Since all of the components, with the exception of the valve 20, are conventional, they are not shown.

In operation, depressing the brake pedal causes the master cylinder to produce increased hydraulic pressure. The brake proportioning valve 20 is disposed between the master cylinder and the rear wheel brakes to allow proportionately less hydraulic pressure from the master cylinder to reach the rear wheel brakes. An inlet pressure is developed in the inlet end portion as a result of increasing hydraulic pressure from the master cylinder when the brake pedal is applied. Similarly, an outlet pressure is developed in the outlet end portion. Outlet pressure depends on the hydraulic equilibrium of the piston, the force associated with the piston spring, and increases or decreases in the inlet pressure.

At low inlet end portion pressures, where the brake is not applied, the valve 20 is in the position of FIG. 1. In this position, brake fluid flows freely through the brake proportioning valve in directions indicated by arrows A and B, and therefore some brake fluid is present in the valve.

The valve has a normal or passive first position, as illustrated in FIG. 1. When the vehicle brake pedal is applied, additional brake fluid enters the cap seat 28b, and passes through the cap bore 28c and into the large bore 32d raising the inlet pressure, which, as noted above, is isolated by the seal 30. As long as the piston 32 is in this position, fluid flows around the ball 38, past the seat 32e, past the rod 40 and through the bore 32f, and through the sections 22d and 22e, and on to the rear wheel brakes. In this position, the inlet pressure is essentially equal to the outlet pressure.

As inlet pressure increases with continued application of the brake pedal, the outlet pressure correspondingly increases until the outlet pressure eventually reaches the above-defined knee point pressure, and creates a force acting on the end 32g of the piston 32 that is sufficient to force the piston 32 in a direction, indicated by arrow A (to the right, as viewed in FIG. 1), overcoming the force of the spring 36. The piston 32 moves to the intermediate position, as shown in FIG. 3, and thus the piston seat 32e engages the ball 38, stopping fluid flow.

As inlet pressure increases, it momentarily overcomes the force created by the outlet pressure, causing the piston 32 rapidly to shift in the direction of arrow B, allowing some fluid to escape around the ball 38 before the resulting increase in outlet pressure quickly moves the piston 32 back again to the position of FIG. 3, resealing the valve. Thus, further increases in the inlet pressure above the knee point pressure results in increases in outlet pressure at a reduced rate. The piston 32 remains in the position illustrated in FIG. 3.

As inlet pressure decreases, on brake pedal release for example, the piston 32 moves in the direction indicated by arrow A until the end 32c of the piston engages the flat surface 28d of the cap 28 to stop further movement of the piston 32. This occurs before the ball spring 39 is completely compressed, preventing an undesirable restriction in flow. When the inlet pressure equals the outlet pressure, the ball 38 disengages from the seat 32e. When the pressures decrease below the knee point pressure, the piston 32 returns to the passive first position, as depicted in FIG. 1.

Thus, the valve 20 allows fluid to flow freely to the rear wheel brakes at low master cylinder outlet hydraulic pressures and restricts the flow of brake fluid to the rear wheel brakes at predetermined higher master cylinder outlet hydraulic pressures, thereby achieving the proper braking proportion between the front and rear wheel brakes.

Several advantages result from the foregoing assembly. For example, the spring 36 surrounds the greater part of the piston 32 and, therefore, the inlet seal 30 and the ball 38. When compared with a spring which is oriented at the end of a piston 32, the present invention results in a shorter valve length. Also, as noted above, the diameter of the piston spring 36 is greater than the diameter of the outlet seal 34, resulting in more design options, including the ability to use stronger springs for producing higher knee points.

Further, this embodiment uses only two elastomeric seals, and thus reduces breakable components. Also, because the inlet seal 30 is disposed inside the piston 32, whereas the outlet seal 34 is disposed outside the piston 32, a more favorable differential is created between the area subjected to the inlet pressure and the area subjected to the outlet pressure, allowing a smaller valve to produce the same knee points as prior art methods.

It is understood that variations can be made within the scope of the invention. For example, the housing 21 could be produced in a variety of shapes, and the transition from section to section of the bore 22 may be gradual instead of stepped. A one piece element could replace the ball 38 and rod 40, having a first portion including a sealing surface shape, such as a ball or cone, and a second portion which is long and narrow. Also, the ball spring 39 is depicted as a straight spring, however, a conical spring, or some other means of exerting force could be used. During flow from the outlet end portion to the inlet end portion, as occurs during brake release, the ball 38 could be pushed far enough to engage the cap extension 28e. If the ball 38 were pushed all the way to the end 28f of the cap extension 28e, the spring 39 would still not be fully compressed and the cross slot 28g would allow fluid flow around the ball 38 as a second means to prevent undesirable flow restriction.

Furthermore, it is understood that all spatial references are for the purpose of example only and are not meant to limit the invention.

Figure 4:
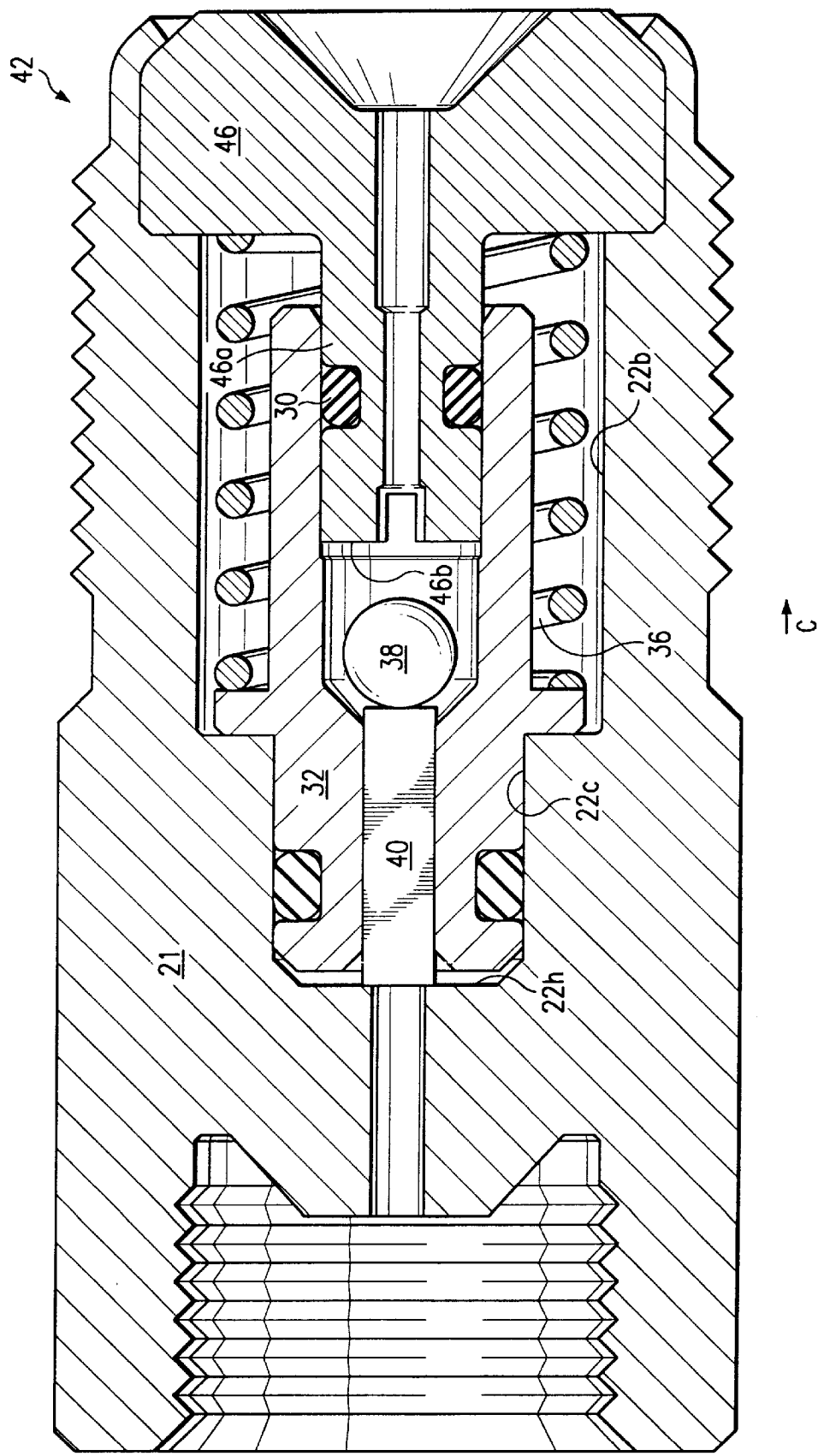
FIG. 4 is a longitudinal sectional view of an alternative embodiment of the present invention.

Referring to FIG. 4 of the drawings, the reference numeral 42 refers to a brake proportioning in-line valve of another embodiment of the present invention. This embodiment incorporates several components of the previous embodiment which are given the same reference numbers. According to FIG. 4, the ball 38 is held in place by gravity and a cap 46 replaces the cap 28 of the previous embodiment. An extension 46a of the cap 46 has an end 46b which extends across the large bore 32d. The valve must be oriented in a direction indicated by arrow C, so that gravity keeps the ball 38 engaged with the rod 40. This embodiment has several advantages, including making the cap extension 46a easier to machine because it has no annular flange, and minimizing flow restrictions because the brake fluid does not have to flow through a ball spring. By reducing flow restrictions, and eliminating the force associated with the ball spring, this embodiment further reduces hysteresis, the lag found when a fluid force changes direction.

Figure 5:
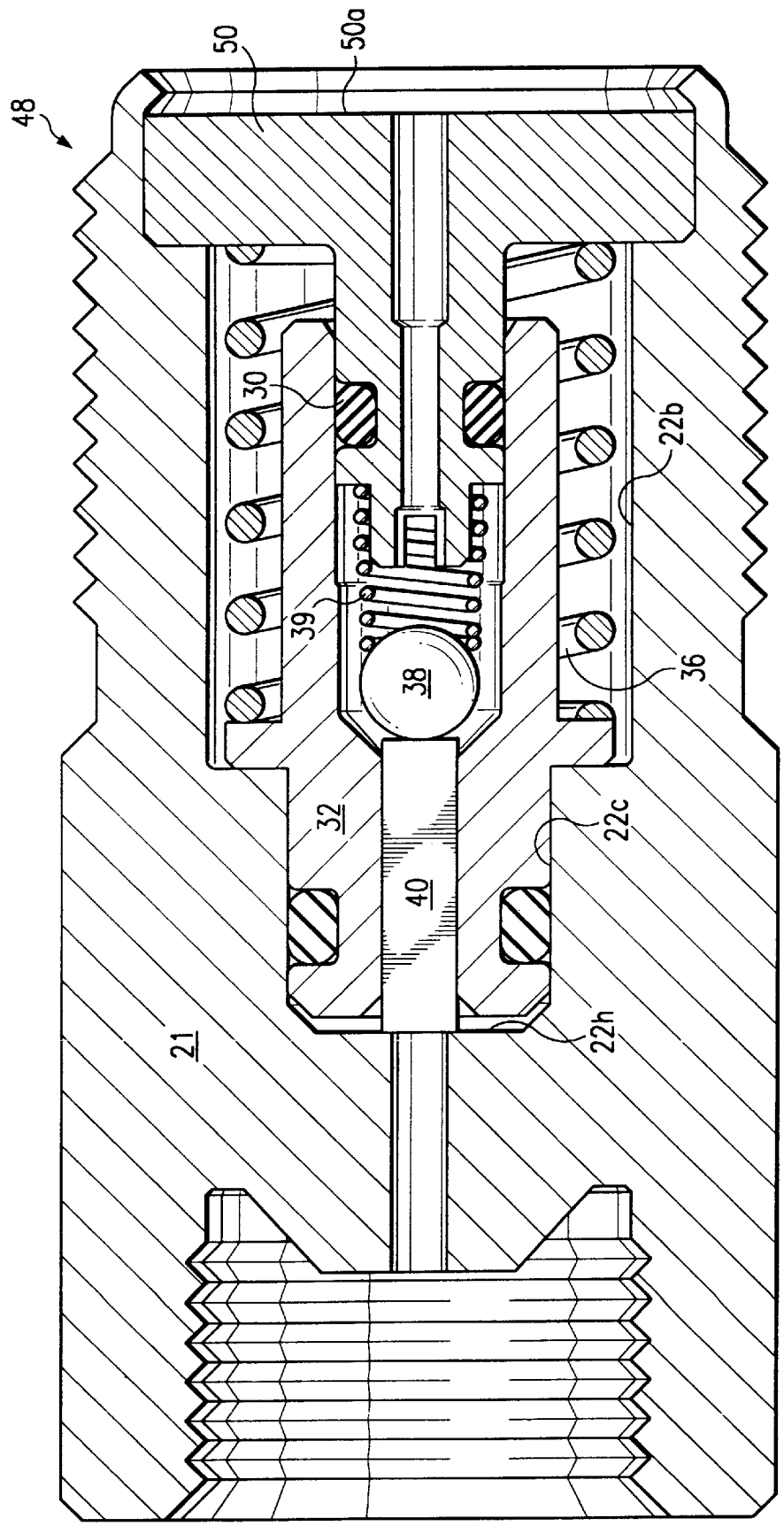
FIG. 5 is a longitudinal sectional view of yet another alternative embodiment of the present invention.

Referring to FIG. 5 of the drawings, the reference numeral 48 refers to a brake proportioning in-line valve of another embodiment of the present invention. This embodiment incorporates several components of the first embodiment which are given the same reference numbers. According to FIG. 5 a cap 50 is provided in place of the cap 28 of the embodiment of FIGS. 1–3. The cap 50 has a flat surface 50a for mating with a fluid inlet. This embodiment could mate with a variety of fluid delivery systems, however, a passage in the system may be required for venting, and another sealing element (not shown) required on the valve 48 to prevent leakage.

Figure 6:
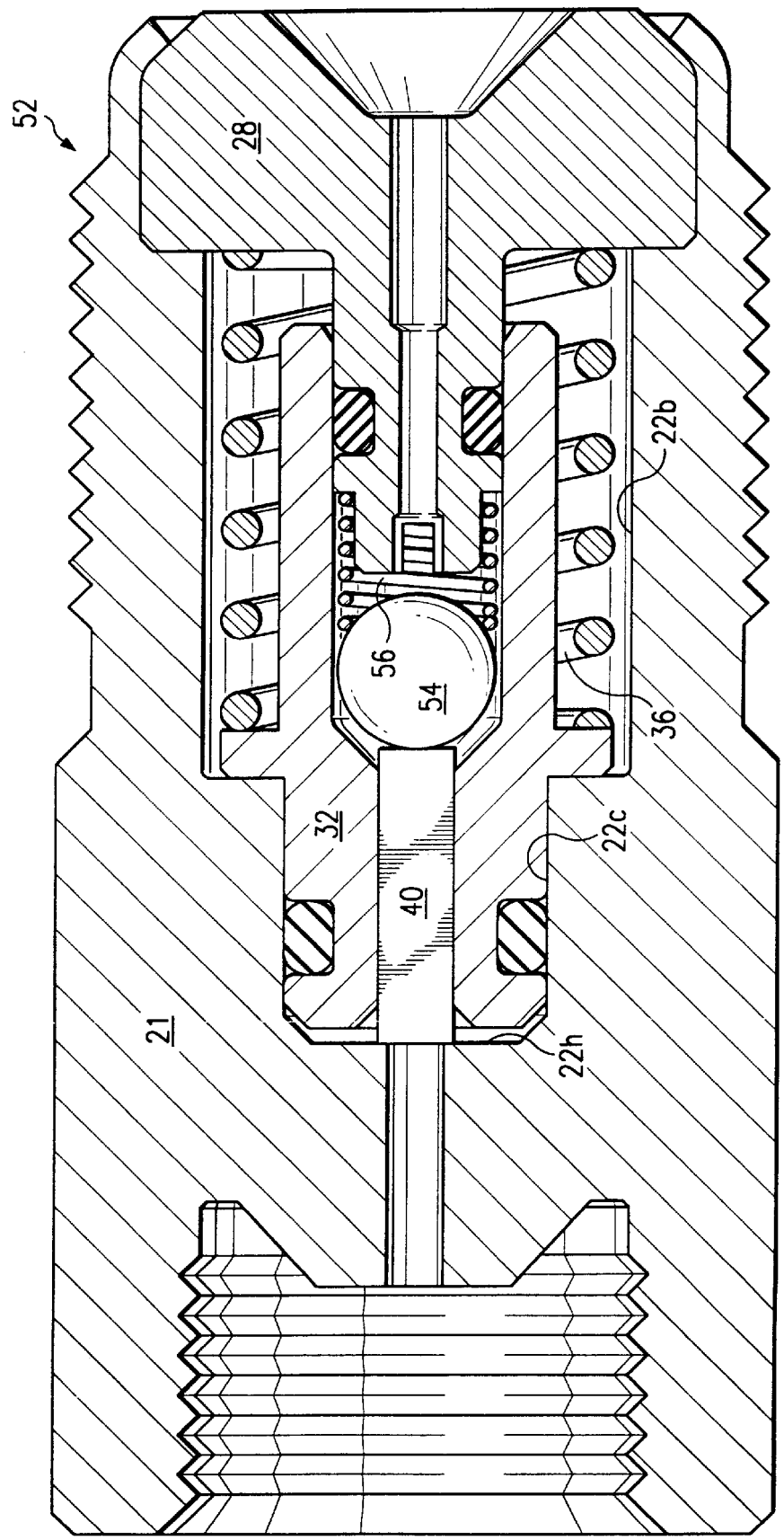
FIG. 6 is a longitudinal sectional view of yet another alternative embodiment of the present invention.

Referring to FIG. 6 of the drawings, the reference numeral 52 refers to a brake proportioning in-line valve of another embodiment of the present invention. This embodiment incorporates several components of the first embodiment which are given the same reference numbers. According to FIG. 6, the ball 38 and spring 39 of the embodiment of FIGS. 1–3 are replaced by a relatively large ball 54 and a spring 56, respectively. As a result, the embodiment has a different pressure proportioning ratio than an embodiment using a smaller ball.

This disclosure shows and describes several illustrative embodiments, however, the disclosure contemplates a wide range of modifications, changes and substitutions. Such variations may employ only some features of the embodiments without departing from the scope of the underlying embodiment. Accordingly, any appropriate construction of the appended claims will reflect the broad scope of the underlying embodiment.

What is claimed is:

1. A device for controlling the flow of fluid, comprising:
   a housing having an inlet for receiving the fluid, an outlet for discharging the fluid, and a bore connecting the inlet to the outlet;
   a piston disposed in the bore and having a through bore for permitting the flow of the fluid through the piston;

a valve member disposed in the bore of the piston and adapted to engage an internal surface of the piston to block fluid flow through the piston and therefore through the housing, the piston responding to an increase in pressure at the outlet as a result of the fluid flow for moving in a direction toward the valve member until the valve member engages the piston surface to restrict fluid flow;

a stop member disposed in the housing and extending into the bore of the piston for stopping movement of the piston after it engages the valve member, the stop member having:
   (i) a through bore for permitting the flow of the fluid from the housing inlet through the stop member to the piston bore, and
   (ii) a transverse slot for preventing blockage of the stop member bore; and means for normally positioning the valve member away from the piston surface so that fluid flows through the piston.

2. The device of claim 1 further comprising a seal disposed in a groove in the stop member and engaging a corresponding surface of the piston.

3. The device of claim 1 further comprising a spring normally urging the piston away from the valve member.

4. The device of claim 1 further comprising a spring normally urging the valve member toward the piston surface.

5. The device of claim 1 wherein the positioning means is a rod disposed in a portion of the bore of the piston and engaging the valve member.

6. The device of claim 1 wherein the valve member is a ball.

7. The device of claim 1 wherein the piston slides relative to the stop member.

8. The device of claim 1 wherein the piston has an inwardly tapered internal surface for engaging the valve member.

9. A brake proportioning valve for controlling the flow of brake fluid, comprising:

a housing having an inlet for receiving the brake fluid, an outlet for discharging the brake fluid, and a bore connecting the inlet to the outlet;

a piston disposed in the bore and having a through bore for permitting the flow of the brake fluid through the piston;

a valve member disposed in the bore of the piston and adapted to engage an internal surface of the piston to block brake fluid flow through the piston and therefore through the housing, the piston responding to an increase in pressure at the outlet as a result of the brake fluid flow for moving in a direction toward the valve member until the valve member engages the piston surface to restrict brake fluid flow;

a stop member disposed in the housing and extending into the bore of the piston for stopping movement of the piston after it engages the valve member, the stop member having:
   (i) a through bore for permitting the flow of the brake fluid from the housing inlet through the stop member to the piston bore, and
   (ii) a transverse slot for preventing blockage of the stop member bore; and means for normally positioning the valve member away from the piston surface so that brake fluid flows through the piston.

10. The device of claim 9 further comprising a seal disposed in a groove in the stop member and engaging a corresponding surface of the piston.

11. The valve of claim 9 further comprising a spring normally urging the piston away from the valve member.

12. The valve of claim 11 wherein the spring surrounds a portion of the piston.

13. The valve of claim 9 further comprising a spring normally urging the valve member toward the piston surface.

14. The valve of claim 13 wherein the stop member extends through a portion of the spring to prevent complete compression of the spring and subsequent restriction of brake fluid flow.

15. The valve of claim 9 wherein the positioning means is a rod disposed in a portion of the bore of the piston and engaging the valve member.

16. The valve of claim 9 wherein the valve member is a ball.

17. The valve of claim 9 further comprising a seal disposed in a groove in the piston and engaging a corresponding surface of the housing, for preserving the increase in pressure at the outlet.

18. The valve of claim 9 wherein the piston slides relative to the stop member.

19. The valve of claim 9 wherein the piston has an inwardly tapered internal surface for engaging the valve member.

20. A brake proportioning valve for controlling the flow of brake fluid, comprising:

a housing having an inlet for receiving the brake fluid, an outlet for discharging the brake fluid, and a bore connecting the inlet to the outlet;

a piston disposed in the bore and having a through bore for permitting the flow of the brake fluid through the piston;

a valve member disposed in the bore of the piston and adapted to engage an internal surface of the piston to block brake fluid flow through the piston and therefore through the housing, the piston responding to an increase in pressure at the outlet as a result of the brake fluid flow for moving in a direction toward the valve member until the valve member engages the piston surface to restrict brake fluid flow;

a seal disposed in a groove in the piston and engaging a corresponding surface of the housing, for preserving the increase in pressure at the outlet;

a spring normally urging the piston away from the valve member, wherein the spring surrounds a portion of the piston including the portion of the piston retaining the valve member;

means for normally positioning the valve member away from the piston surface so that brake fluid flows through the piston;

a stop member disposed in the housing and extending into the bore of the piston for stopping movement of the piston after it engages the valve member the stop member having:
   (i) a through bore for permitting the flow of the brake fluid from the housing inlet through the stop member to the piston bore, and
   (ii) a transverse slot for preventing blockage of the stop member bore;

a seal disposed in a groove in the stop member and engaging a corresponding surface of the piston for preserving the increase in pressure at the inlet; and a spring normally urging the valve member toward the piston surface, wherein the stop member extends through a portion of the spring to prevent complete compression of the spring and subsequent restriction of brake fluid flow.

21. The valve of claim 20 wherein the positioning means is a rod disposed in a portion of the bore of the piston and engaging the valve member.

22. The valve of claim 20 wherein the valve member is a ball.

23. The valve of claim 20 wherein the piston slides relative to the stop member.

24. The valve of claim 20 wherein the piston has an inwardly tapered internal surface for engaging the valve member.

25. A brake proportioning valve for controlling the flow of brake fluid, comprising:
  a housing having an inlet for receiving the brake fluid, an outlet for discharging the brake fluid, and a bore connecting the inlet to the outlet;
  a piston disposed in the housing bore and having a through bore for permitting the flow of the brake fluid through the piston;
  a stop member disposed in the housing and extending into the bore of the piston, the stop member having:
    (i) a through bore for permitting the flow of the brake fluid from the housing inlet through the stop member to the piston bore, and
    (ii) a transverse slot for preventing blockage of the stop member bore; and
  a ball disposed in the bore of the piston, and biased between a spring attached to the stop member and a rod disposed in the piston bore,
  wherein the ball is adapted to engage an internal surface of the piston to block brake fluid flow through the piston and therefore through the housing, the piston responding to an increase in pressure at the outlet as a result of the brake fluid flow for moving in a direction toward the ball until the ball engages the piston surface to restrict brake fluid flow, the rod normally positioning the ball away from the piston surface so that brake fluid flows through the piston.

26. The valve of claim 25 wherein the piston has an inwardly tapered internal surface for engaging the ball.

27. A brake proportioning valve for controlling the flow of brake fluid, comprising:
  a housing having an inlet for receiving the brake fluid, an outlet for discharging the brake fluid, and a bore connecting the inlet to the outlet;
  a stop member disposed in the housing and extending into the housing bore, the stop member having:
    (i) a through bore for permitting the flow of the brake fluid from the housing inlet through the stop member to the piston bore, and
    (ii) a transverse slot for preventing blockage of the stop member bore;
  a piston disposed in the housing bore and surrounding a portion of the stop member, the piston having:
    (i) a through bore for permitting the flow of the brake fluid through the piston, and having a first diameter portion and second diameter portion, and
    (ii) an internal surface connecting the first and second diameter portions of the piston bore;
  a ball member disposed in the bore of the piston and adapted to engage the piston surface to block brake fluid flow through the piston and therefore through the housing, the piston responding to an increase in pressure at the outlet as a result of the brake fluid flow for moving in a direction toward the ball member until the ball member engages the piston surface to restrict brake fluid flow;
  a rod for normally positioning the ball member away from the piston surface so that brake fluid flows through the piston;
  a spring for biasing the ball member against the rod; and
  means for centering the ball member on the rod.

28. The valve of claim 27, wherein the means for centering the ball member on the rod comprise providing that diameter of the ball member is only slightly smaller than the piston bore diameter.

29. The valve of claim 27 wherein the piston has an inwardly tapered internal surface for engaging the ball.

30. The valve of claim 29, wherein the means for centering the ball member on the rod comprise engaging the tapered internal surface of the piston.

31. A brake proportioning valve for controlling the flow of brake fluid, comprising:
  a housing having an inlet for receiving the brake fluid, an outlet for discharging the brake fluid, and a bore connecting the inlet to the outlet;
  a stop member disposed in the housing and extending into the housing bore, the stop member having:
    (i) a through bore for permitting the flow of the brake fluid from the housing inlet through the stop member to the piston bore, and
    (ii) a transverse slot for preventing blockage of the stop member bore;
  a piston disposed in the housing bore, the piston having:
    (i) a through bore for permitting the flow of the brake fluid through the piston, and having a first diameter portion and second diameter portion, and
    (ii) an inwardly tapered internal surface connecting the first and second diameter portions of the piston bore;
  a ball member disposed in the bore of the piston and adapted to engage the piston surface to block brake fluid flow through the piston and therefore through the housing, the piston responding to an increase in pressure at the outlet as a result of the brake fluid flow for moving in a direction toward the ball member until the ball member engages the piston surface to restrict brake fluid flow, wherein the tapered shape of the piston surface automatically centers the ball member for optimal sealing; and
  a rod for normally positioning the ball member away from the piston surface so that brake fluid flows through the piston.

\* \* \* \* \*